UNITED STATES PATENT OFFICE.

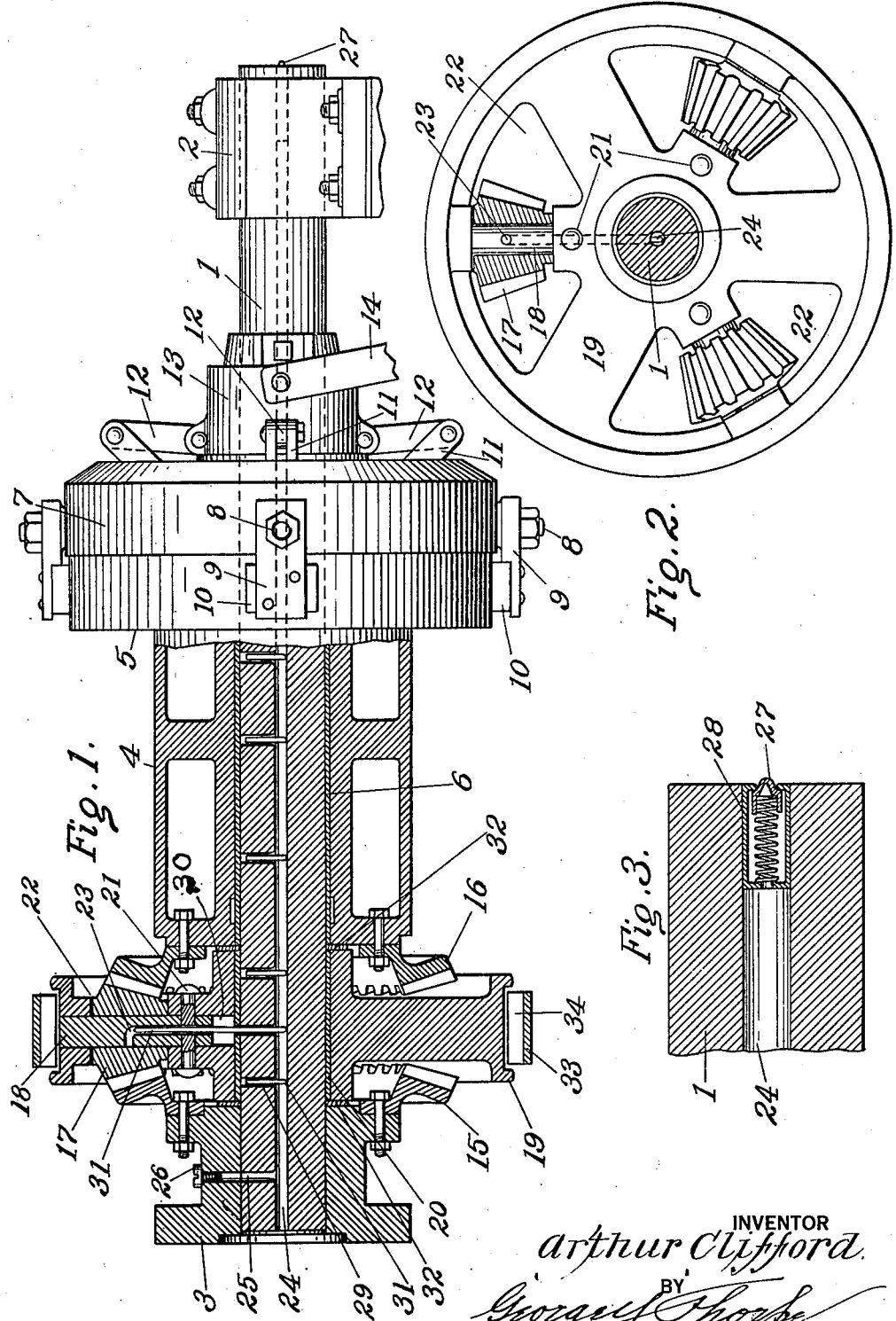

ARTHUR CLIFFORD, OF KANSAS CITY, MISSOURI, ASSIGNOR TO WEBER ENGINE COMPANY, OF KANSAS CITY, MISSOURI, A CORPORATION OF IOWA.

REVERSIBLE CLUTCH-PULLEY.

1,292,260.      Specification of Letters Patent.      Patented Jan. 21, 1919.

Application filed June 6, 1918. Serial No. 239,083.

*To all whom it may concern:*

Be it known that I, ARTHUR CLIFFORD, a citizen of the United States, residing at Kansas City, in the county of Jackson and State of Missouri, have invented certain new and useful Improvements in Reversible Clutch-Pulleys, of which the following is a specification.

This invention relates to reversible clutch pulleys for use chiefly with oil well machinery, and the objects of the invention are to provide a construction to admit of the use of replace-spacer washers for insuring proper relation of certain operative parts,— particularly the shaft, brake wheel, pulley and the gearing carried by and between said elements—and for the infallible lubrication of said parts through the utilization of centrifugal force to effect a proper and efficient distribution of the lubricant during the operation of the pulley.

With these general objects in view, the invention consists in certain novel and useful features of construction and combinations of parts as hereinafter described and claimed; and in order that it may be fully understood reference is to be had to the accompanying drawing, in which:—

Figure 1, is a view partly in side elevation and partly in central longitudinal section, of a reversible clutch pulley embodying my improvements.

Fig. 2, is a face view of the brake wheel of the device, with certain pinions in central section.

Fig. 3, is a longitudinal section of one end of the shaft to show a spring-seated plug or closure for the oil reservoir provided in the shaft.

In the said drawing, 1 indicates the shaft of the device, journaled at one end in a bearing standard 2 and adapted to be bolted at its opposite end to the fly-wheel of the engine, not shown, for operating the shaft, the latter having a collar 3 rigid upon it to facilitate such connection and to serve as the support for a bevel gear hereinafter referred to.

The pulley 4 is provided with a clutch-member 5 at one end and is equipped with a bronze or other suitable bushing 6 journaled on the shaft. A collar or spider 7, is keyed upon the shaft and extending radially through the same are a number of rods 8, equipped at their outer ends with arms 9 provided with wood or equivalent clutch shoes 10 for engagement with the clutch-member 5. The inner ends of the said rods are suitably connected to toggles composed of members 11 and 12, the latter being connected pivotally to the slidable collar 13 on the shaft, and to a lever 14 for imparting sliding movement to said collar to cause said blocks to grip or release the clutch-member.

Bolted as shown or otherwise secured to the collar 3, is a large beveled gear wheel 15, a similar wheel 16 being bolted or otherwise secured to the adjacent end of the pulley, and said gear wheels are intergeared with a plurality of beveled pinions 17, journaled on radially extending pins 18 fitted in a brake wheel 19, provided with a bushing 20, journaled on the shaft 1, the said pins being secured firmly in position by a series of cross pins 21, carried by said brake wheel. The gear pinions are prevented from sliding inward and outward upon said pins 18, by fitting within openings 22 in the said wheel, and are provided with longitudinal oiling passages 23 which extend to the outer surfaces of pins 18 from the inner ends thereof.

The shaft is provided with an axial bore or passage 24 closed at one end by the fly-wheel but provided near said end with a radial passage 25 for filling purposes, said passage being closed by a plug 26. At its opposite end the bore or passage, constituting an oil reservoir, is closed by a spring-actuated plug 27 fitting in a flanged tube 28 secured within the bore or passage. If desired an oil injector can be pressed against said plug 27 to repress the same and then be operated to charge the bore with oil, this action occurring if desired, while the shaft is in operation.

The shaft is provided with a plurality of radial distributing passages 29 extending from the bore or passage 24 to the outer side of the shaft to supply oil to the bushings, and certain of said radial passages communicate with openings 30 in the bushing of the brake wheel to supply oil to the passages 23 for conducting oil to the bearings of the beveled pinions 17.

To facilitate the flow or movement of the oil or to retard the same accordingly as the oil is thick and viscous or thin, pins 31 are fitted in the radial passages, the pins in radial alinement with the passages 23 being of length to extend into the latter as well, and all of said pins 31 are adapted to have a slight longitudinal movement or play to guard against possibility of the oil closing the passages.

In reversible clutch pulleys which are subjected to heavy service, as in the oil fields, great trouble has been encountered for years through the shifting of the elements upon the shaft to such extent that the wear upon the gear wheels and pinions becomes uneven and soon necessitates replacement of parts. Until the advent of my clutch pulley forming the subject of this application, this trouble had never been overcome, and to overcome the trouble, I have remodeled without departing from the principle of construction of the old type, to make it practicable to use spacer washers, the same being interposed between the pulley and the brake wheel as shown at 32. If there is undue wear at one side, the spacer washer at that side is replaced by a thicker one or its width is augmented by the use of an additional one. By this means the projection of the teeth of the pinions in the two gear wheels 15 and 16 can be kept uniform and the life of all of said parts be lengthened.

Any suitable brake band can be employed in connection with the brake wheel, that shown consisting of a band 33 equipped at its inner side with a plurality of wood shoes 34, and any common means may be employed for applying or releasing the brake band.

Assuming that the shaft is charged with lubricating oil, it will be apparent that the starting of the engine with the clutch mechanism inoperative and the brake band loose, will not affect the pulley, but that when the clutch mechanism is thrown into operative condition the pulley will be driven, the brake wheel turning with it because interlocked therewith and with the shaft through the gear wheels. It will also be apparent that when the clutch is rendered inoperative and the band is applied to the brake wheel, the operation of the pulley will be reversed. As the reversible clutch as a whole substantially like the one described is in common use in the oil fields and is not original with applicant, the exact operations of the gear wheels, i. e., the directions in which they turn during the operations of the pulley, are not traced.

From the above description it will be apparent that I have produced a reversible clutch pulley embodying the features of advantage set forth in the statement of the object of the invention, and while I have shown the preferred construction of the device, it will be understood that I reserve the right to make such changes as properly fall within the spirit and scope of the appended claims.

I claim:

1. A reversible clutch pulley comprising a shaft, a pulley journaled thereon, means to clutch and unclutch the pulley with respect to the shaft, a collar rotatable with the shaft, a wheel journaled on the shaft between the collar and pulley, spacer washers on the shaft between the wheel and said collar and pulley, gear wheels carried by the adjacent ends of the collar and pulley, radial pins secured in said wheel, gear pinions journaled on said pins and enmeshed with said gear wheels, and a brake for engagement with said pinion-carrying wheel; said shaft having an oil reservoir and radial passages leading therefrom to the inner ends of said pins, and the latter having oil passages leading from their inner ends to their external surfaces at points engaged by said pinions.

2. A reversible clutch pulley comprising a shaft provided with an oil reservoir and passages leading outward therefrom, a closing plug for one end of the said reservoir, a pulley journaled on said shaft over one or more of said passages and provided with a clutch member, a collar on said shaft, a brake wheel journaled on said shaft over certain of the passages thereof and provided with radial pins having longitudinal passages in communication at their inner ends with said passages covered by the brake wheel, and at their outer ends with the exterior surfaces of said pins, slidable pins in the oil passages of the shaft, gear pinions journaled on the said radial pins, gear wheels rigid with the shaft and pulley respectively and enmeshed with said pinions at opposite sides thereof, means for engaging the clutch member to lock the pulley to the shaft, and means to engage the said wheel journaled on the shaft to lock said wheel to the shaft.

In testimony whereof I affix my signature.

ARTHUR CLIFFORD.